US009041924B2

(12) United States Patent
Amako

(10) Patent No.: US 9,041,924 B2
(45) Date of Patent: May 26, 2015

(54) TRANSMISSIVE DIFFRACTION GRATING AND DETECTION APPARATUS

(75) Inventor: Jun Amako, Tsurugashima (JP)

(73) Assignee: Seiko Epson Corporation (JP)

( * ) Notice: Subject to any disclaimer, the term of this patent is extended or adjusted under 35 U.S.C. 154(b) by 148 days.

(21) Appl. No.: 13/530,786

(22) Filed: Jun. 22, 2012

(65) Prior Publication Data

US 2012/0327412 A1    Dec. 27, 2012

(30) Foreign Application Priority Data

Jun. 23, 2011   (JP) .................................. 2011-139527

(51) Int. Cl.
*G01J 3/28* (2006.01)
*G02B 27/42* (2006.01)
*G01J 3/18* (2006.01)
*G01J 3/44* (2006.01)
*G02B 5/18* (2006.01)
*G01J 3/02* (2006.01)

(52) U.S. Cl.
CPC .............. *G02B 27/4261* (2013.01); *G01J 3/18* (2013.01); *G01J 3/44* (2013.01); *G02B 5/1871* (2013.01); *G02B 27/4272* (2013.01); *G01J 3/0224* (2013.01)

(58) Field of Classification Search
CPC ..................................... G01J 3/28; G02B 5/18
USPC ........................................... 356/328; 359/558
See application file for complete search history.

(56) References Cited

U.S. PATENT DOCUMENTS

| 5,392,116 A * | 2/1995 | Makosch ...................... 356/495 |
| 6,504,976 B1 * | 1/2003 | Polynkin et al. ................ 385/37 |
| 7,081,955 B2 | 7/2006 | Teichmann et al. |
| 7,319,559 B2 | 1/2008 | Nakama et al. |
| 7,688,512 B2 | 3/2010 | Kittaka et al. |
| 2006/0000976 A1 * | 1/2006 | Brouns ........................ 250/353 |
| 2006/0176542 A1 * | 8/2006 | Muro et al. ................... 359/290 |
| 2011/0279818 A1 | 11/2011 | Amako et al. |

FOREIGN PATENT DOCUMENTS

| JP | 10-111176 | 4/1998 |
| JP | 10-148707 | 6/1998 |
| JP | 2004-127339 | 4/2004 |

(Continued)

OTHER PUBLICATIONS

"Section 1 Technology for Producing High-Efficiency Diffractive Optical Element Through an Electron Beam Lithography and its Optical Characteristics", The Complete Works of the Latest Optical Diffractive Element Technology, Technical Information Institute Co., Ltd., pp. 107-120 (2004).

*Primary Examiner* — Tarifur Chowdhury
*Assistant Examiner* — Omar Nixon
(74) *Attorney, Agent, or Firm* — Harness, Dickey & Pierce, P.L.C.

(57) ABSTRACT

A transmissive diffraction grating includes a polarization conversion layer, a first diffractive layer disposed on one surface side of the polarization conversion layer, and a second diffractive layer disposed on the other surface side of the polarization conversion layer. Both the first diffractive layer and the second diffractive layer include refractive index modulation structures arranged with a period P in a first direction, and diffraction efficiency for a TE polarized light component is higher than a diffraction efficiency for a TM polarized light component.

19 Claims, 13 Drawing Sheets

(56) References Cited

FOREIGN PATENT DOCUMENTS

| JP | 2004-170853 | 6/2004 |
| JP | 2004-354176 | 12/2004 |
| JP | 2005-208331 | 8/2005 |
| JP | 2007-101926 | 4/2007 |
| JP | 2007-310052 | 11/2007 |
| JP | 2008-102488 | 5/2008 |
| JP | 2008-216424 | 9/2008 |
| JP | 2011-237374 | 11/2011 |

* cited by examiner

α : FIRST-ORDER DIFFRACTION EFFICIENCY FOR TE POLARIZED LIGHT
β : FIRST-ORDER DIFFRACTION EFFICIENCY FOR TM POLARIZED LIGHT

TRANSMISSIVE DIFFRACTION GRATING AND DETECTION APPARATUS

BACKGROUND

1. Technical Field

The present invention relates to a transmissive diffraction grating and a detection apparatus.

2. Related Art

In the related art, a large number of diffraction gratings which are used in spectroscopic apparatuses such as a Raman spectroscope are of the reflection type. As an example of the reflective diffraction grating, there is the blazed grating of which the cross-section is formed to have a saw-tooth shape (for example, a diagram disclosed in JP-A-2004-354176).

However, the reflective diffraction grating has a problem in that improving the wavelength resolution and widening the wavelength band capable of obtaining high diffraction efficiency are difficult to achieve together. For example, in the blazed diffraction grating, the cross-sectional shape is blazed, and thereby the diffraction efficiency is improved. However, in the blazed diffraction grating, when the grating period is shortened in order to improve the wavelength resolution, a wavelength band capable of obtaining high diffraction efficiency becomes very narrow.

FIG. 12 shows an example of the blazed diffraction grating as a comparative example of the present embodiment. As shown in FIG. 12, it is assumed that a grating period of the blazed diffraction grating is Pa, a wavelength of the incident light is $\lambda a$, an incidence angle of the incident light is $\alpha a$, and a diffraction angle of the first-order diffracted light is $\beta a$.

First, the wavelength resolution will be described. The wavelength resolution $\Delta\beta/\Delta\lambda$ of the diffraction grating is expressed by the following Equation (1). From the following Equation (1), it can be seen that the grating period Pa is made smaller and the diffraction angle $\beta a$ is made greater in order to increase the wavelength resolution $\Delta\beta/\Delta\lambda$.

$$\Delta\beta/\Delta\lambda = 1/(Pa \cdot \cos \beta a) \quad (1)$$

FIG. 13 shows a characteristic example of the wavelength resolution $\Delta\beta a/\Delta\lambda a$ for the diffraction angle $\beta a$ when the wavelength $\lambda a=633$ nm and the grating period Pa=333 nm in Equation (1). In this example, the ratio of the wavelength and the grating period is $\lambda a/Pa=1.9$. At this time, the diffraction angle $\beta a$ becomes 72 degrees, and the wavelength resolution $\Delta\beta a/\Delta\lambda a$ is improved to about 0.01.

Next, diffraction efficiency of the first-order diffracted light will be described. In a case of the reflective diffraction grating, the cross-sectional shape thereof is blazed, and thereby it is possible to increase the diffraction efficiency. However, if the grating period Pa becomes smaller in order to increase the wavelength resolution $\Delta\beta a/\Delta\lambda a$, it is difficult to obtain high diffraction efficiency even if the cross-sectional shape is blazed (The Complete Works of the Latest Optical Diffractive Element Technology, TECHNICAL INFORMATION INSTITUTE CO., LTD, p. 107 to p. 120 (2004)). As such, in the reflective diffraction grating such as the blazed diffraction grating, it is difficult to realize both high wavelength resolution and high diffraction efficiency.

For example, in a spectroscopic apparatus such as a Raman spectroscope, there is a demand for a diffraction grating which achieves both high wavelength resolution and high diffraction efficiency at a wide wavelength band. In Raman spectroscopy, scattering light from a sample is mainly formed by Rayleigh scattering light and Raman scattering light (hereinafter, attention is paid to a Stoke component which has a Raman scattering wavelength $\lambda ray + \Delta\lambda$ longer than a Rayleigh scattering wavelength $\lambda ray$). In this Raman spectroscopy, there are several problems in terms of practical use. First, the intensity of the Raman scattering light is much weaker than the intensity of the Rayleigh scattering light. Next, in a case of specifying a material by Raman spectroscopy, it is necessary to separate the Raman scattering light scattered from the sample at a wavelength resolution of about 0.5 nm. In addition, there are cases where a wavelength difference between the Rayleigh scattering light and the Raman scattering light is obtained widely up to approximately 100 nm. In consideration of this factor, in the diffraction grating used for Raman spectroscopy, it is necessary to obtain high wavelength resolution of about 0.5 nm from the visible region to the near infrared region (wavelengths 400 nm to 1100 nm). In addition, it is necessary to obtain high diffraction efficiency in a wide wavelength band of approximately 100 nm.

Further, in a case where the optical characteristics of the diffraction grating are considerably dependent on the polarization state of incident light, a detector is only able to incorporate an extremely small portion of scattering light having no deviation in the polarization azimuth and a signal to noise ratio is decreased. Therefore, excessive specifications for the detector are required.

SUMMARY

An advantage of some aspects of the invention is to provide a transmissive diffraction grating and a detection apparatus using the same, capable of obtaining high diffraction efficiency in a case where there is no deviation in the polarization azimuth of incident, light and a diffractive layer has considerable polarization dependency.

(1) An aspect of the invention is directed to a transmissive diffraction grating including a polarization conversion layer; a first diffractive layer disposed on one surface side of the polarization conversion layer; and a second diffractive layer disposed on the other surface side of the polarization conversion layer, wherein both the first diffractive layer and the second diffractive layer include refractive index modulation structures arranged with a period P in a first direction, and diffraction efficiency for a TE polarized light component is higher than diffraction efficiency for a TM polarized light component.

Here, a direction where the same refractive index structures extend so as to intersect the first direction is a second direction. Linearly polarized light of which the polarization azimuth is parallel to the second direction is the TE polarized light, and linearly polarized light of which the polarization azimuth is vertical to the second direction is the TM polarized light.

According to the aspect of the invention, when incident light having no deviation in the polarization azimuth is incident to, for example, the first diffractive layer, the diffraction efficiency for the TE polarized light components is high, and thus a large number of the TE polarized light components are diffracted. On the other hand, the diffraction efficiency for TM polarized light components is low, and thus a large number of the TM polarized light components are transmitted therethrough. Next, in the polarization conversion layer, the TE polarized light components are polarization-converted into TM polarized light components, and the TM polarized light components are polarization-converted into TE polarized light components. In addition, in the second diffractive layer as well, since the diffraction efficiency for the TE polarized light components is high and the diffraction efficiency for the TM polarized light components is low, a large number of the TE polarized light components are diffracted, and a large number of the TM polarized light components are transmitted therethrough.

Here, when first-order diffraction efficiency of each of the first and second diffractive layers for the TE polarized light is α, and first-order diffraction efficiency of each of the first and second diffractive layers for the TM polarized light is β, light use efficiency of the transmissive diffraction grating is given as light use efficiency=α+(1−2α)β. In a case where the polarization dependency of the first-order diffraction efficiency is large and α≅1 and β≅0, the light use efficiency of the above equation is almost the same as α. In other words, the light use efficiency of the diffraction grating is substantially the same as the first-order diffraction efficiency of the diffraction gratings for the TE polarized light, forming the diffraction grating. In this way, it is possible to obtain high diffraction efficiency even if the polarization dependency of the first-order diffraction efficiency is large in the diffractive layer.

(2) In one aspect of the invention, when a wavelength of a spectral wavelength band is λ, the polarization conversion layer may be a λ/2 wavelength plate. The λ/2 wavelength plate polarization-converts TE polarized light components into TM polarized light components, and TM polarized light components into TE polarized light components.

(3) In one aspect of the invention, the polarization conversion layer may include a plurality of laminated quartz crystal plates. Since a phase difference close to 180 degrees can be realized in a wavelength band to be used in a plurality of quartz crystal plates as well, it is possible polarization-convert TE polarized light components into TM polarized light components, and TM polarized light components into TE polarized light components.

(4) In one aspect of the invention, each of the first diffraction layer and the second diffraction layer may further include a base layer joined to the polarization conversion layer, and may have the refractive index modulation structures on the base layer. In this way, the base layer joined to the polarization conversion layer is processed through lithography, imprint, or interference fringe exposure, thereby forming the refractive index modulation structures on the base layer surface.

(5) In one aspect of the invention, the refractive index modulation structures may have a concave and convex pattern. Since the refractive index of a convex portion is different from the refractive index of a recess (the refractive index of air) which is a concave portion, it is possible to implement a refractive index modulation structure.

(6) In one aspect of the invention, the refractive index modulation structures may be structures formed by alternately laminating a material of a first refractive index and a material of a second refractive index in the first direction, instead of the concave and convex pattern.

(7) In one aspect of the invention, when a height of the refractive index modulation structure is h, 1.5<λ/P<2.0 and 1.75<h/P<2.50 may be satisfied.

In this way, it is possible to implement transmissive diffraction grating having high efficiency of the first-order diffracted light and large polarization dependency of the same efficiency. Here, the lower limit of λ/P is defined from a request that the polarization dependency of the first-order diffraction efficiency is large. The upper limit of λ/P is defined a request that first-order diffracted light can be emitted to the air. In addition, the upper limit and the lower limit of h/P are defined from a condition that efficiency of about 90% or more of the maximum value of the first-order diffraction efficiency present in both of them is given.

(8) In one aspect of the invention, each of the first diffractive layer and the second diffractive layer may have inclined surfaces formed by a dielectric, and the inclined surfaces may be arranged so as to be inclined with respect to a reference line. In addition, when an incidence angle of incident, light is an angle α with respect to the reference line, and a diffraction angle of diffracted light is an angle β with respect to the reference line, the incidence angle θ1 may be smaller than a Bragg angle θ with respect to the reference line, and the diffraction angle θ2 may be larger than the Bragg angle θ.

According to the aspect the invention, the inclined surfaces formed by a dielectric are arranged to be inclined with respect to the reference line. In addition, incident light to the transmissive diffraction grating is incident with the angle θ1 smaller than the Bragg angle θ, and diffracted light is emitted with the angle θ2 larger than the Bragg angle θ. Thereby, it is possible to improve a wavelength resolution, and to thereby widen a wavelength band.

Another aspect of the invention is directed to a detection apparatus including the above-described transmissive diffraction grating; an optical system that causes scattering light or reflected light from a target object to be incident to the transmissive diffraction grating; and a detector that detects diffracted light from the transmissive diffraction grating.

BRIEF DESCRIPTION OF THE DRAWINGS

The invention will be described with reference to the accompanying drawings, wherein like numbers reference like elements.

FIGS. 4A and 4B are characteristic diagrams illustrating an operation of the diffraction grating, wherein FIG. 4A shows a diffraction and polarization conversion operation for a TE polarized light component of the incident light, and FIG. 4B shows a diffraction and polarization conversion operation for a TM polarized, light component of the incident light.

DESCRIPTION OF EXEMPLARY EMBODIMENTS

Hereinafter, embodiments of the invention will described in detail. In addition, the embodiments described below do not inappropriately limit the contents of the invention cited in the claims, and all the constituent elements described in the embodiments may not be essential as solving means of the invention.

1. First Embodiment
1.1 Diffraction Grating

Figure 1:
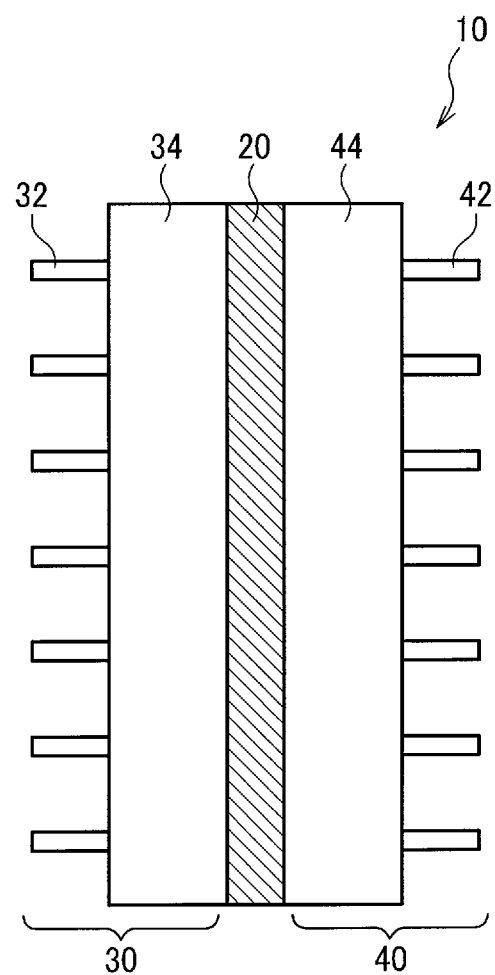
FIG. 1 is a schematic diagram of a transmissive diffraction grating according to an embodiment of the invention.

FIG. 1 shows a diffraction grating 10 which is a spectroscope according to the embodiment. The diffraction grating 10 is of a transmission type, and may be formed by one kind or two kinds of dielectrics which are transparent for the wavelength to be used. The transmissive diffraction grating (hereinafter, also referred to as a diffraction grating) 10 includes a polarization conversion layer 20, a first diffractive layer 30 disposed on one surface side of the polarization conversion layer 20, and a second diffractive layer 40 which is disposed on the other surface side of the polarization conversion layer 20.

The first diffractive layer 30 has a refractive index modulation structure 32, and the second diffractive layer 40 has a refractive index modulation structure 42. The first diffractive layer 30 may further include a base layer 34 joined to the polarization conversion layer 20. In this case, the first diffractive layer 30 has the refractive index modulation structure 32 on the base layer 34. Similarly, the second diffractive layer 40 may further include a base layer 44 joined to the polarization conversion layer 20. In this case, the second diffractive layer 40 has the refractive index modulation structure 42 on the base layer 44.

Here, in the embodiment, the refractive index modulation structures 32 and 42 have a concave and convex pattern by the dielectrics. For example, a resist pattern may be formed on the base layers 34 and 44 through laser interference exposure, and the resist pattern is transferred onto the base layers 34 and 44 through lithography or imprinting, thereby forming the concave and convex pattern.

Figure 2:
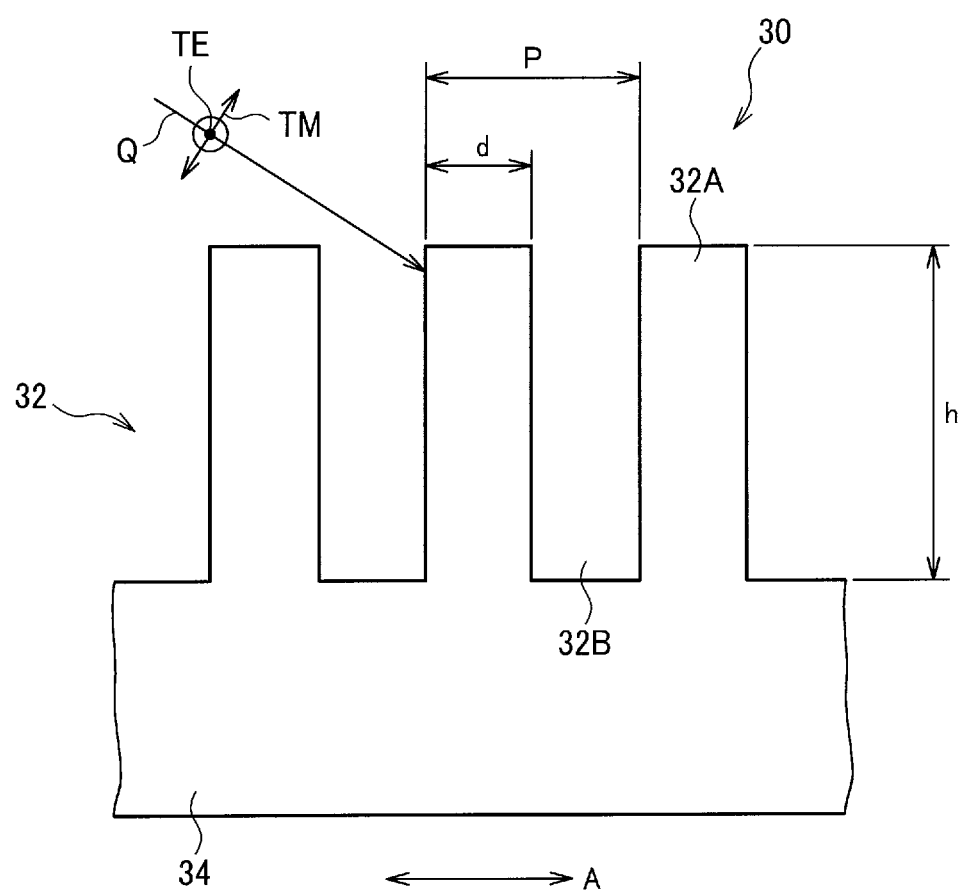
FIG. 2 is a diagram illustrating a first diffractive layer of the diffraction grating and incident light thereto.

FIG. 2 shows a part of the first diffractive layer 30 having the same structure (period, depth, and line width) as the second diffractive layer 40. As shown in FIG. 2, the refractive index modulation structure 32 of the first diffractive layer 30 has the concave and convex pattern where convex portions 32A extending, for example, vertically from the base layer 34 and concave portions (recesses) 32B located between the two convex portions 32A are alternately formed in first direction A. The refractive index modulation structure 42 of the second diffractive layer 40 is the same as that of the refractive index modulation structure 32.

In other words, the refractive index modulation structure 32 (42) is formed by alternately disposing the convex portion 32A (42A) of the refractive index n1 and the concave portion 32B (42E) of the refractive index n2 (the refractive index 1 of the air) in the first direction A with a period P.

Each of the refractive index modulation structures 32 and 42 of the first and second diffractive layers 30 and 40 has, for example, the period P: 400 nm, depth h: 800 nm, and line width d/the period P (fill factor): 0.45.

1.2 TE Polarized Light and TM Polarized Light

Here, incident light to the diffraction grating 10 generally has no deviation in the polarization azimuth. In FIG. 2, since the direction of the concave portion (recess) 32B of the diffraction grating 10 is a direction (second direction) vertical to the ground, polarized light where an oscillation direction (polarization azimuth) of the electric field vector is a direction vertical to the ground is the TE polarized light, and polarized light where an oscillation direction (polarization azimuth) of the electric field vector is a direction parallel to the ground is the TM polarized light. Therefore, the incident light Q to the diffraction grating 10 shown in FIG. 2 includes both the TE polarized light and the TM polarized light.

The polarization conversion layer 20 has a function as a ½ wavelength plate, and rotates by 90° the azimuth of the linearly polarized light which is incident. That is to say, the polarization conversion layer 20 converts the TE polarized light into the TM polarized light, and converts the TM polarized light to the TE polarized light. The polarization conversion layer 20 is designed so as to function as a ½ wavelength plate with respect to obliquely incident light with a specific angle. Such a wavelength plate can be realized by, for example, oblique deposition. As the polarization conversion layer 20, a wideband wavelength plate disclosed in, for example, JP-A-2007-310052, may be used.

Figure 3:
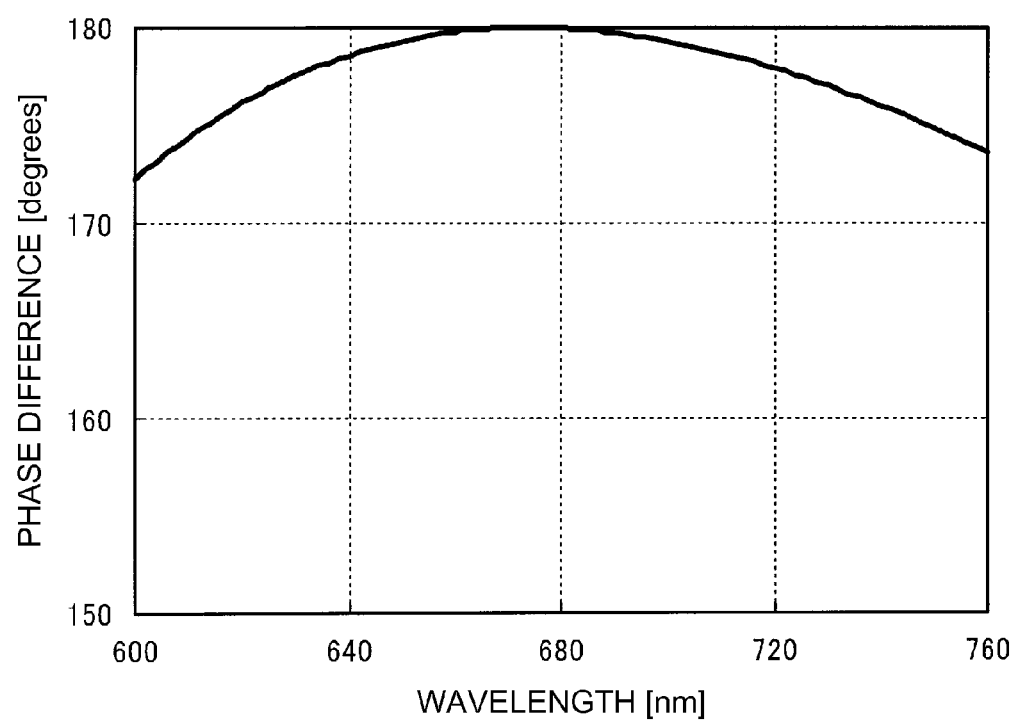
FIG. 3 is a characteristic diagram of wavelength-phase difference of a polarization conversion layer formed by laminating a plurality of quartz crystal plates.

In addition, as disclosed in JP-A-2004-170853, a laminate of a plurality of quartz crystal plates which are cut with a specific crystal azimuth may be used as the polarization conversion layer 20. As an example, the relationship between the phase difference and the wavelength of the polarization conversion layer 20 which is formed by joining two Y-cut quartz crystal plates to each other is shown in FIG. 3. It is possible to obtain the phase difference 180 degrees at the wavelength 680 nm and the phase difference 172 degrees or more at the wavelength band of 600 nm to 760 nm. This is a sufficient characteristic in using the invention for Raman spectroscopy.

1.3 Diffraction Efficiency and Polarization Dependency

Figure 4A:
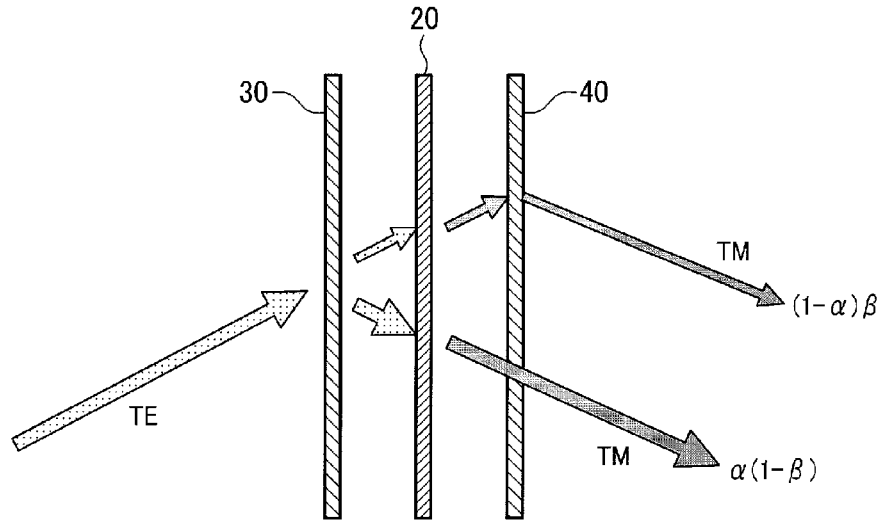
Figure 4B:
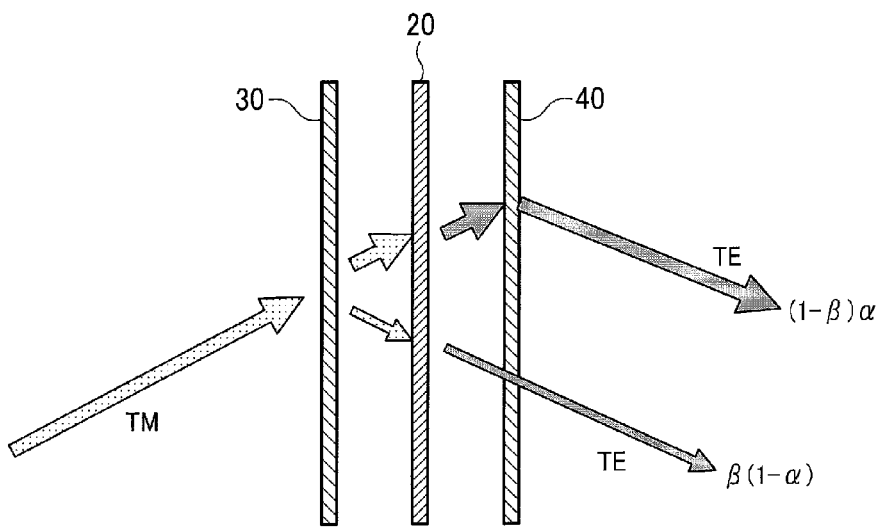

FIGS. 4A and 4B show an operation of the transmissive diffraction grating 10. In FIGS. 4A and 4B, first-order diffraction efficiency of each of the first and second diffractive layers 30 and 40 for the TE polarized light is $\alpha$, and first-order diffraction efficiency of each of the first and second diffractive layers 30 and 40 for the TM polarized light is $\beta$.

In the embodiment, each of the first and second diffractive layers 30 and 40 has the diffraction efficiency for the TE polarized light components larger than the diffraction efficiency for the TM polarized light components. In other words, in a case where $\alpha > \beta$ and $1.5 < \lambda/P < 2.0$ for the wavelength $\lambda$ and the grating period P is satisfied, it may be regarded as $\alpha \gg \beta$ and $\alpha \cong 1$ and $\beta \cong 0$.

As shown in FIG. 4A, since the diffraction efficiency $\alpha$ for the TE polarized light components is large, a large number of the TE polarized light components are diffracted by the first diffractive layer 30 and are converted into the TM polarized light components when passing through the polarization conversion layer (½ wavelength plate) 20. Since the diffraction efficiency $\beta$ for the TM polarized light components is small, a large number of the TM polarized light components are not diffracted by the second diffractive layer 40 and are transmitted therethrough.

On the other hand, as shown in FIG. 4B, since the diffraction efficiency $\beta$ for the TM polarized light components is small, a large number of the TM polarized light components are not diffracted by the first diffractive layer 30 and are transmitted therethrough, and are converted into the TE polarized light components when passing through the polarization conversion layer 20 (½ wavelength plate) Since the diffraction efficiency $\alpha$ for the TE polarized light components is large, a large number of the TE polarized light components are diffracted by the second diffractive layer 40.

When the above-described diffraction efficiency α and β are used, light use efficiency of the diffraction grating 10 is given as follows.

$$\text{Light use efficiency} = \alpha + (1 - 2\alpha)\beta \quad (2)$$

Here, in a case where the polarization dependency of the first-order diffraction efficiency is large and $\alpha \cong 1$ and $\beta \cong 0$, Equation (2) is almost the same as α. In other words, the light use efficiency of the diffraction grating 10 is substantially the same as the first-order diffraction efficiency of the gratings for the TE polarized light, forming the diffraction grating. In this way, most of the light rays incident to the diffraction grating 10 can be diffracted, that is, separated.

On the other hand, in a case where the polarization dependency of the first-order diffraction efficiency is small and $\alpha \cong \beta$, Equation (2) becomes $2\alpha(1-\alpha)$. Therefore, the use efficiency is the maximum at α=0.5, but a value thereof remains at 0.5 which is a half of the use efficiency of the case where the polarization dependency of the first-order diffraction efficiency is great. It can be seen from this that it is necessary for the invention to use a diffraction grating having great polarization dependency.

As such, in the diffraction grating 10 according to the embodiment, by the use of the two diffraction gratings (first and second diffractive layers 30 and 40) having great polarization dependency of the diffraction efficiency characteristic, it is possible to achieve high diffraction efficiency and remove polarization dependency.

In addition, if the two diffraction gratings (first and second diffractive layers 30 and 40) are formed on the substrate surfaces of the polarization conversion layer (½ wavelength plate) 20, the thickness of the entire diffraction grating 10 can be made 2 mm or less, and the thickness does not cause any problem in a case where the diffraction grating is mounted on a spectroscope.

Figure 5A:
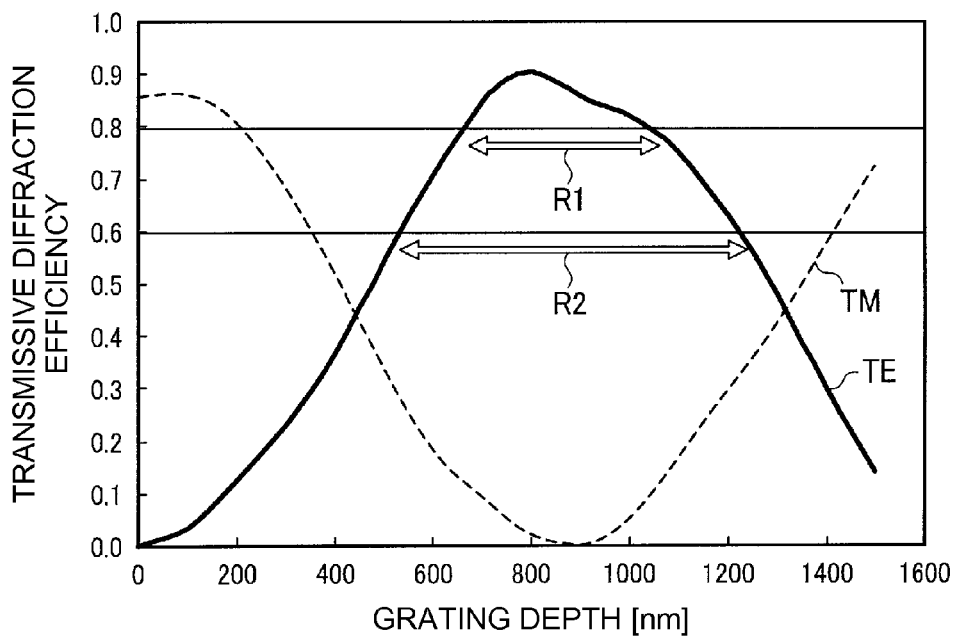
FIG. 5A is a characteristic diagram illustrating the relationship between the diffraction efficiency and the grating depth.
Figure 5B:
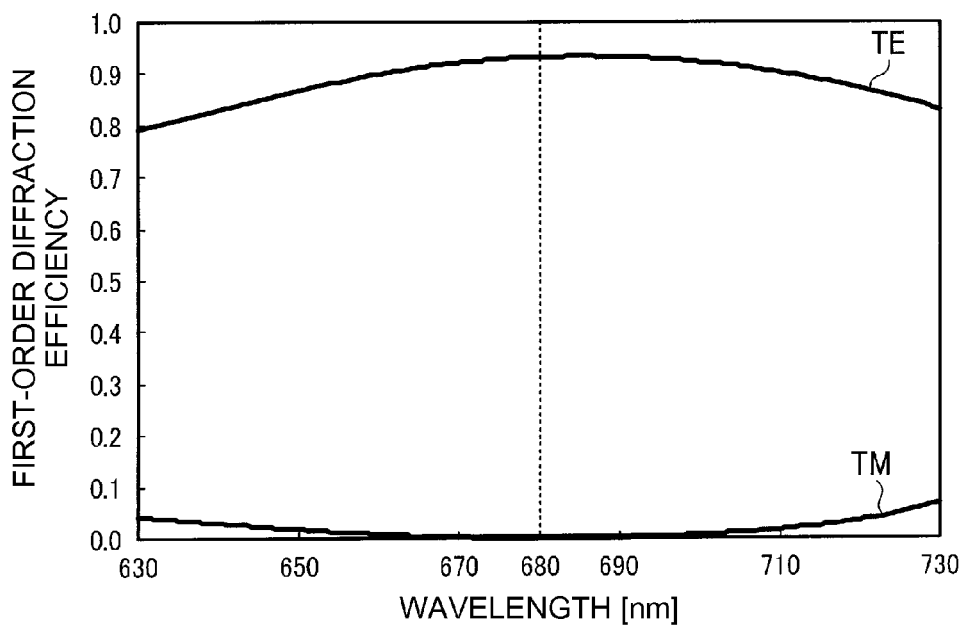
FIG. 5B is a characteristic diagram illustrating the relationship between the diffraction efficiency and the wavelength.

FIGS. 5A and 5B show an example of the diffraction efficiency characteristics of the grating. FIG. 5A shows the relationship between the transmissive diffraction efficiency and the grating depth, and FIG. 5B shows the relationship between the first-order diffraction efficiency and the wavelength. The grating period is 400 nm, and the cross-sectional shape is a substantially rectangular shape. An incidence angle of light is 58 degrees, and a Bragg diffraction condition is satisfied at the wavelength 680 nm. The efficiency of the first-order diffracted light used for Raman spectroscopy is 93% for the TE polarized, light and 0% for the TM polarized light at the central wavelength 680 nm as shown in FIG. 5B. As such, the polarization, dependency of diffraction efficiency is very great. As shown in FIG. 5A, if the grating depth is 700 to 1000 nm (R1), efficiency of the TE polarized light is approximately 80% or more, and if the grating depth is 500 to 1200 nm (R2), efficiency of the TE polarized light is approximately 60% or more. In addition, as shown in FIG. 5B, if a grating wavelength band to be used is 630 to 730 nm, the efficiency of the TE polarized light is 80% or more, and efficiency of the TM polarized light is 7% or less.

1.4 Wavelength Resolution

Figure 6:
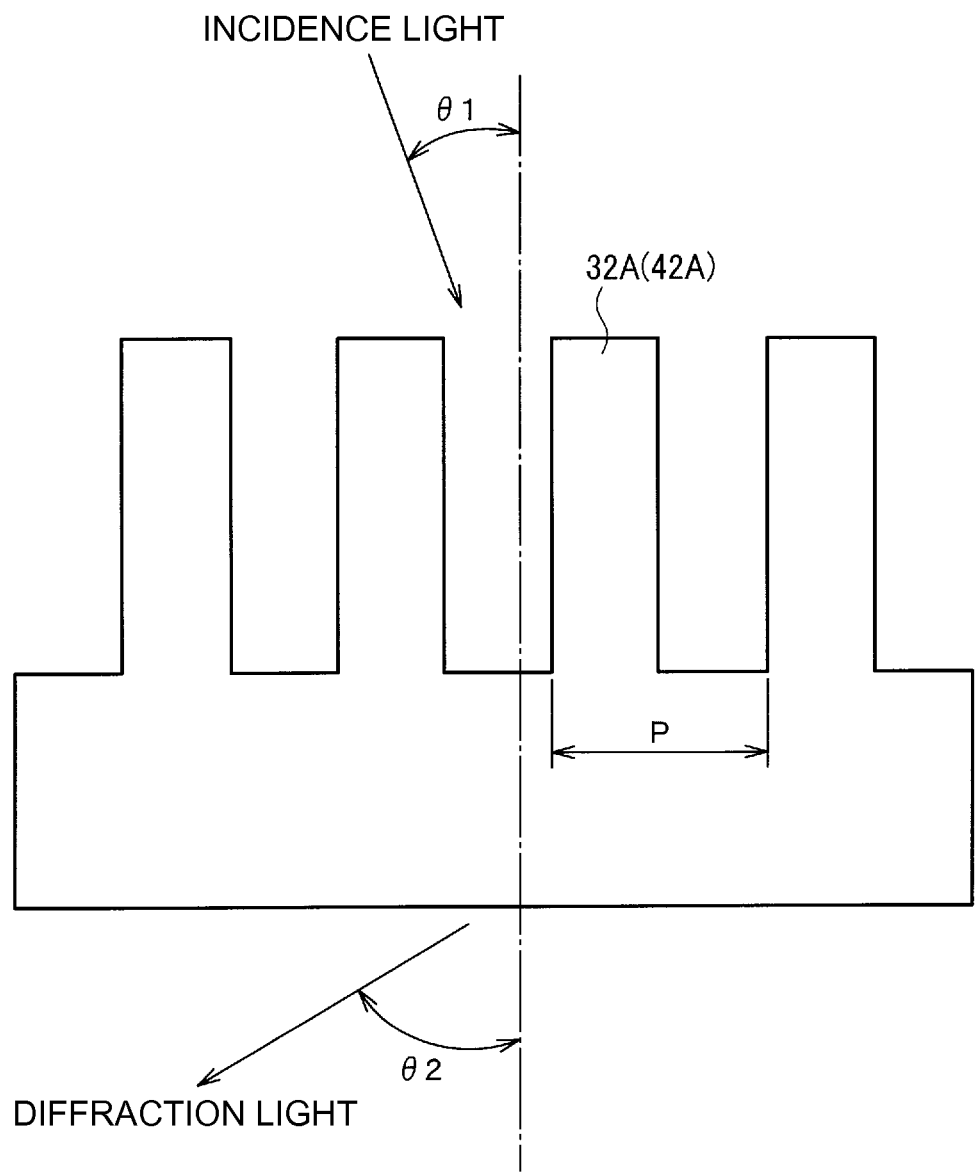
FIG. 6 is a characteristic diagram illustrating the relationship between the incidence angle and the diffraction angle.

The refractive index modulation structure 32 of the first diffractive layer 30, as shown in FIG. 6, has an incidence angle θ1 and the diffraction angle θ2. Here, the wavelength resolution is given as follows.

$$\text{Wavelength resolution} = \Delta\theta 2/\Delta\lambda (\text{rad/nm}) = 1/P \cos \theta 2 \quad (3)$$

(3) Therefore, if the grating interval P is made small and the diffraction angle θ2 is made large, it can be seen that the wavelength resolution is increased.

As such, if the wavelength resolution can be increased, the spectroscopy can be possible at the short distance, and thus a detection apparatus including the diffraction grating can be miniaturized. In this way, in the embodiment, it is possible to achieve high diffraction efficiency, removal of polarization dependency, and high wavelength resolution together.

2. Second Embodiment

Figure 7:
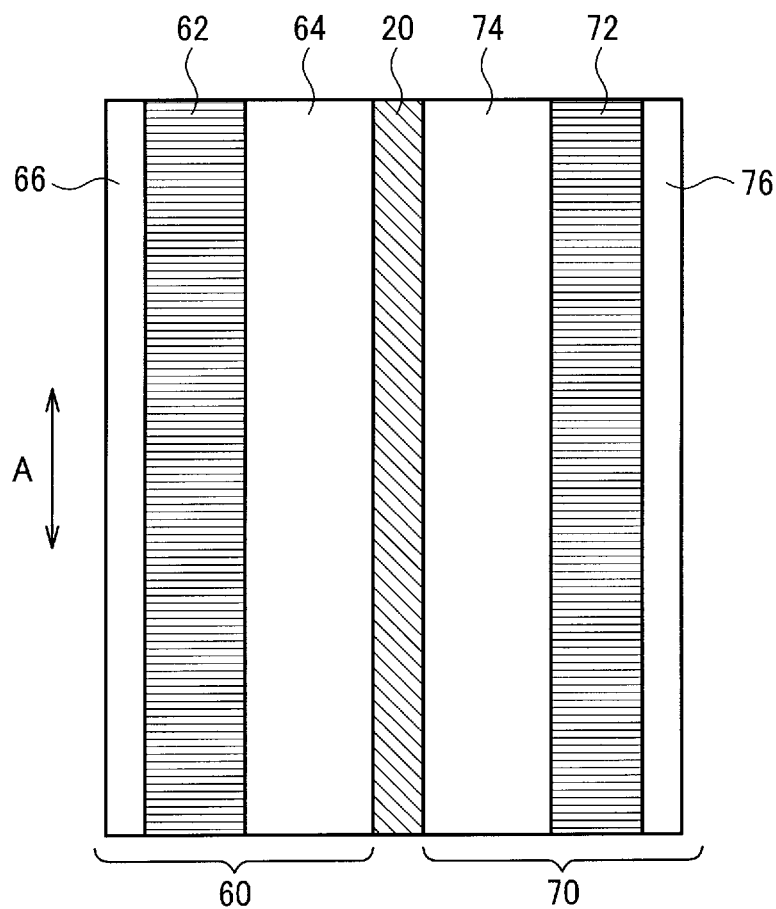
FIG. 7 is a diagram illustrating a transmissive diffraction grating according to a second embodiment of the invention.

FIG. 7 shows a transmissive diffraction grating 50 according to a second embodiment of the invention. The diffraction grating 50 shown in FIG. 7 also includes a polarization conversion layer 20, a first diffractive layer 60 disposed on one surface side of the polarization conversion layer 20, and a second diffractive layer 70 which is disposed on the other surface side of the polarization conversion layer 20.

The first diffractive layer 60 has a refractive index modulation structure 62, and the second diffractive layer 70 has a refractive index modulation structure 72.

The first diffractive layer 60 may further include either or both of a base layer 64 joined to the polarization conversion layer 20 and a protective layer 66 for protecting the refractive index modulation structure 62. Similarly, the second diffractive layer 70 may further include either or both of a base layer 74 joined to the polarization conversion layer 20 and a protective layer 76 for protecting the refractive index modulation structure 72.

Here, in the embodiment, the refractive index modulation structures 62 and 72 do not have a concave and convex pattern formed by dielectrics unlike in the first embodiment. The refractive index modulation structures 62 and 72 are structures where a material of the first refractive index n1 and a material of the second refractive index n2 are alternately laminated in the first direction A, and do not use the concave portion 32B (42B) having the refractive index of the air unlike in the first embodiment.

In the refractive index modulation structure 62 (72) for example, interference fringe exposure is performed for the base layer 64 (74) with laser or the like, dry or wet development is performed, and then a distribution structure of the first and second refractive indexes n1 and n2 can be formed on the surface of the base layer 64 (74).

Therefore, even if the diffraction grating 50 is used instead of the diffraction grating 10 according to the first embodiment, it is possible to achieve high diffraction efficiency, removal of polarization dependency, and high wavelength resolution together.

As such, upon comparison with a third embodiment described later, the invention is applied to the diffraction grating having no inclination in the first and second embodiments. Therefore, since the polarization dependency of diffraction efficiency is great, it is possible to use a high density diffraction grating (λ/P>1.5) which has not attracted an attention in the related art for a spectroscopic apparatus.

3. Third Embodiment

Figure 8:
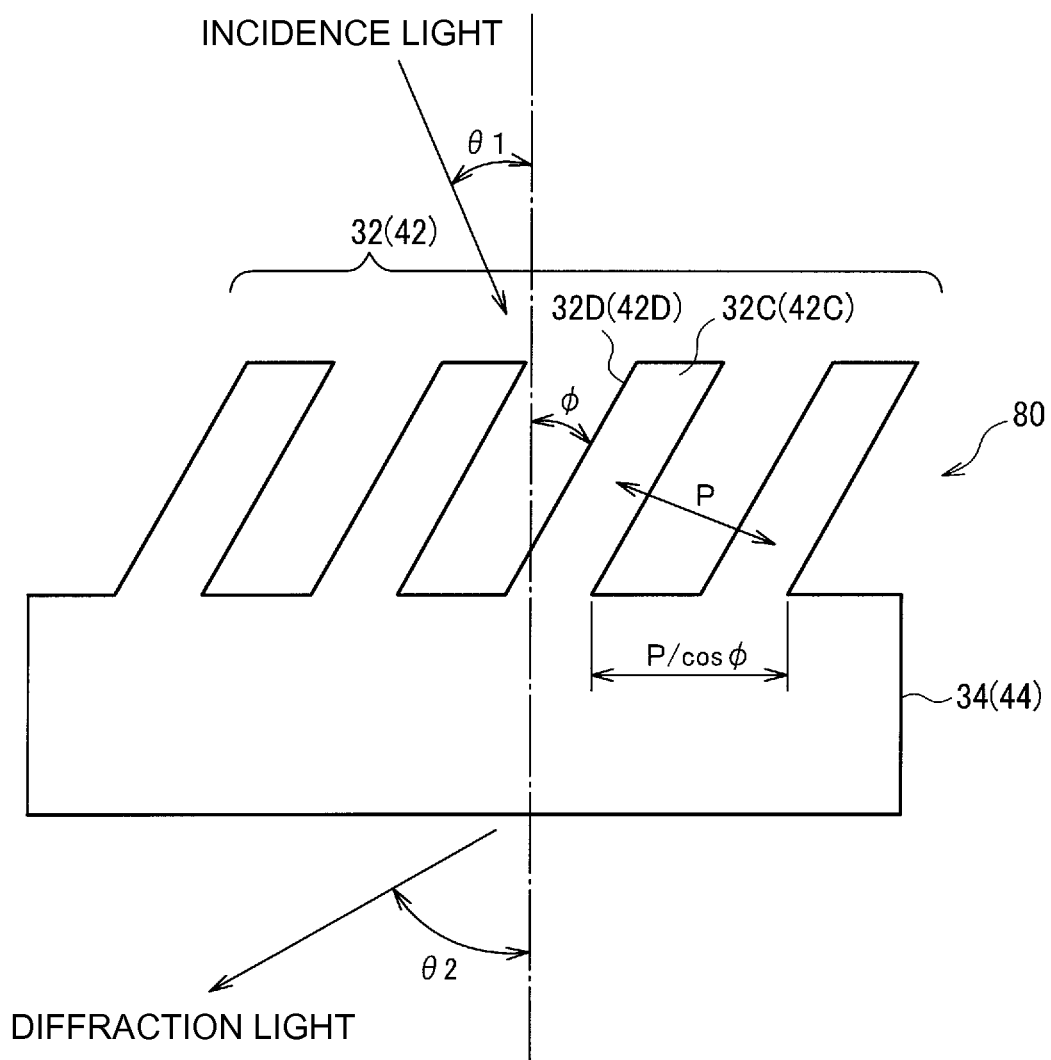
FIG. 8 is a diagram illustrating a diffractive layer having an inclined refractive index modulation structure according to a third embodiment of the invention.

In the embodiment, a period structure causing Bragg reflection is made inclined so as to increase a diffraction angle, thereby achieving improvement in a wavelength resolution and a wideband of diffraction efficiency. FIG. 8 is a cross-sectional view of a diffractive layer 80 having inclined convex portions 32C (42C) instead of the convex portions 32A (42A) shown in FIG. 6.

The convex portions 32C (42C) are arranged at the period P/cos φ (grating interval) in the first direction A. The convex portions 32C (42C) are formed, for example, so as to be inclined by an angle φ (φ>0°) with respect to a reference line L perpendicular to the main surface of the base layer 34 (refer to FIG. 8). More specifically, the convex portions 32C (42C) are provided with inclined surfaces 32D (42D) which is inclined by the angle φ with respect to the reference line L. The inclined surfaces 32D (42D) have a period P in the direction perpendicular to the inclined surfaces 32D (42D), and diffracted light (Bragg reflected light) is generated by a period structure of the period P. In addition, the wavelength λ to be used and the grating period P preferably satisfy 1.25<λ/P<2.0, and more preferably satisfy 1.5<λ/P<2.0. In addition, preferably, the grating period P is 250 to 550 nm, and the height of the convex portions 32C (42C) is 500 to 1100 nm. In addition, the inclined angle is preferably φ<45°.

As shown in FIG. 8, incident light of the wavelength λ is incident to the diffraction grating with an angle θ1, and diffracted light is diffracted and transmitted with an angle θ2. Here, the wavelength resolution Δθ2/Δλ is expressed by the following Equation (4). In addition, if φ=0 in the following Equation (4), Equation (3) can be obtained, which is an equation expressing the wavelength resolution when there is no inclination.

$$\Delta\theta2/\Delta\lambda = \cos\phi/(P\cdot\cos\theta2) \quad (4)$$

Next, a method of improving the wavelength resolution and the diffraction efficiency according to the embodiment will be described. As shown in FIG. 8, the embodiment uses Bragg diffraction by the period structure of the inclined surfaces 32D (42D). The example shown in FIG. 8 will be described through comparison with the case of the inclined angle φ=0° (FIG. 6). When an incidence angle of incident light generating the Bragg diffraction is a Bragg angle θ, the Bragg condition is expressed by the following Equation (5) if a refractive index of the air (medium) is n. In FIG. 8, the Bragg angle θ is substantially the same as an angle with respect to the inclined surfaces 32D (42D).

$$2nP\sin\theta = \lambda \quad (5)$$

As described above, it is necessary to increase the Bragg angle θ (diffraction angle) in order to increase the wavelength resolution Δθ2/Δλ. It can be seen from Equation (5) that P is made to decrease if the Bragg angle θ is to be increased. However, as described above, if the period P is decreased, a wavelength band where diffraction efficiency is high becomes narrow. Therefore, in the embodiment, as shown in FIG. 8, the diffraction angle θ2 is increased by inclining the convex portions 32C (42C). At this time, the incidence angle θ1 is approximately θ1=θ−φ, and the diffraction angle θ2 is approximately θ2=θ+φ. In addition, strictly, it cannot be said that the incidence angle θ1=θ−φ, and the diffraction angle θ2=θ+φ. As such, since the diffraction angle θ2 is further increased, than the Bragg angle θ by inclining the convex portions 32C (42C), the wavelength resolution Δθ2/Δλ can be increased, and the period P can be made to have a larger value than in the case of φ=0°, by the use of the diffraction angle θ2.

Figure 9:
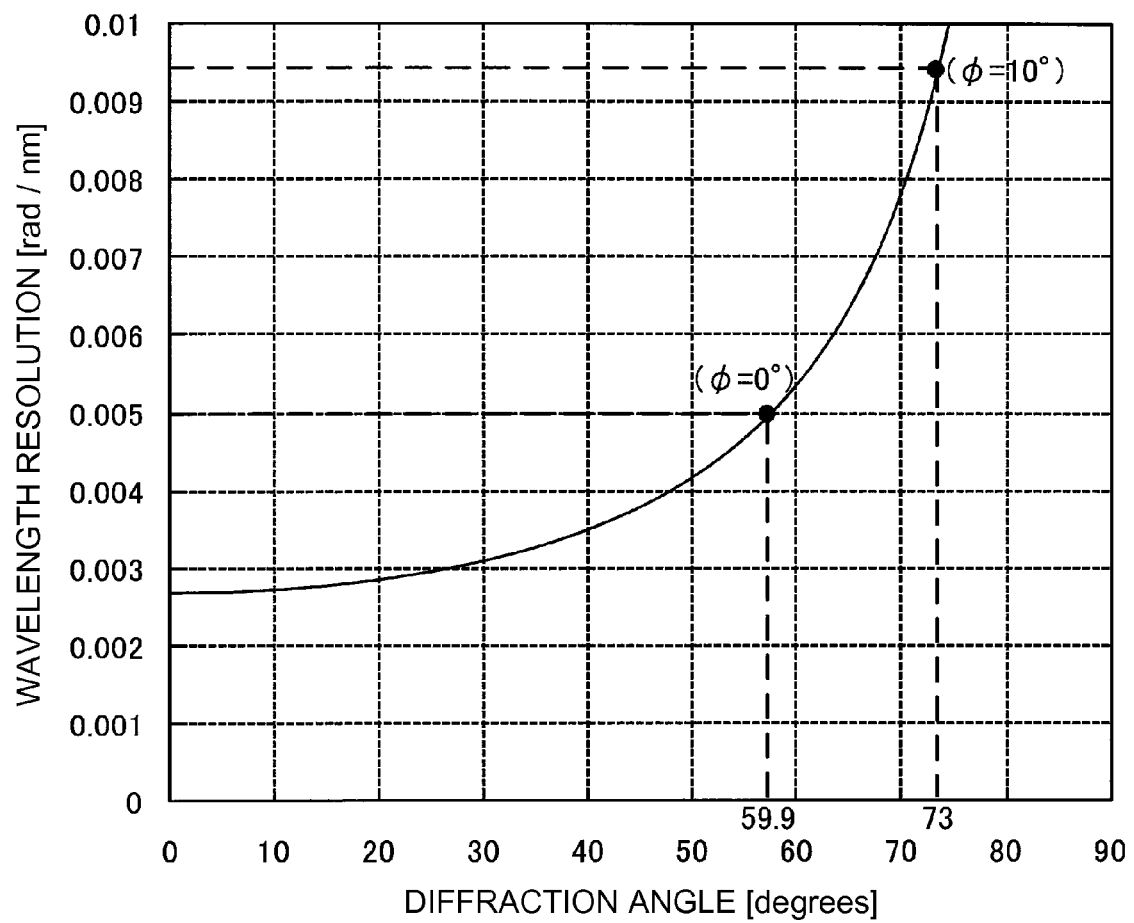
FIG. 9 is a characteristic diagram illustrating the relationship between the diffraction angle and the wavelength resolution.

FIG. 9 shows a characteristic example of the wavelength resolution for the diffraction angle. FIG. 9 shows an example of the case of the wavelength λ=633 nm, the grating period P=366 nm, and the inclined angle φ=10°, a Bragg angle of the first-order transmissive diffracted light is θ=59.9°. The grating period P=366 nm is a larger value by 10% than the grating period Pa=333 nm in the related art. In addition, the wavelength resolution of this diffraction grating is the same as the wavelength resolution of the diffraction grating having no inclination where the period P/cos φ=366/cos(10°)=372 nm.

In the case of φ=0° without inclination, the diffraction efficiency of the first-order diffracted light becomes the maximum around the Bragg angle θ=59.9° which is the diffraction angle. At this time, as shown in FIG. 9, the wavelength resolution is 0.005 [rad/nm]. On the other hand, if the grating is inclined by φ=10°, the diffraction angle is increased to θ2=73°, and thus the wavelength resolution is improved about 1.8 times the case of φ=0° and is 0.009 [rad/nm] or more. As such, the diffraction grating is inclined by the angle φ=10°, and thereby it is possible to realize high diffraction efficiency around the diffraction angle β=73°.

Figure 10A:
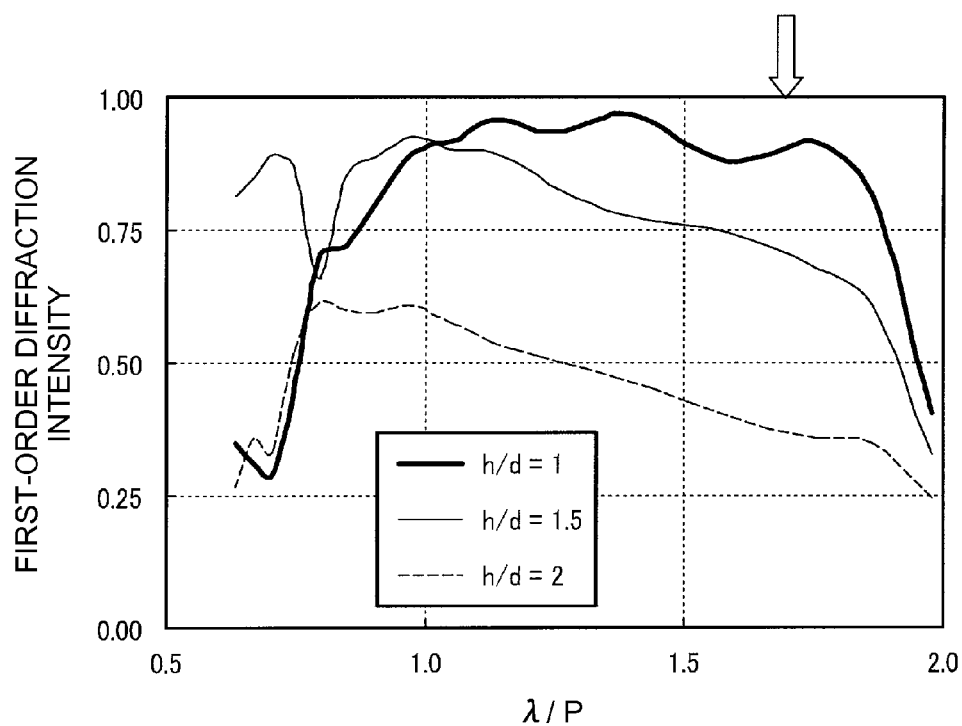
FIG. 10A is a characteristic diagram illustrating the relationship between λ/P and first-order diffraction efficiency for the TE polarized light component.
Figure 10B:
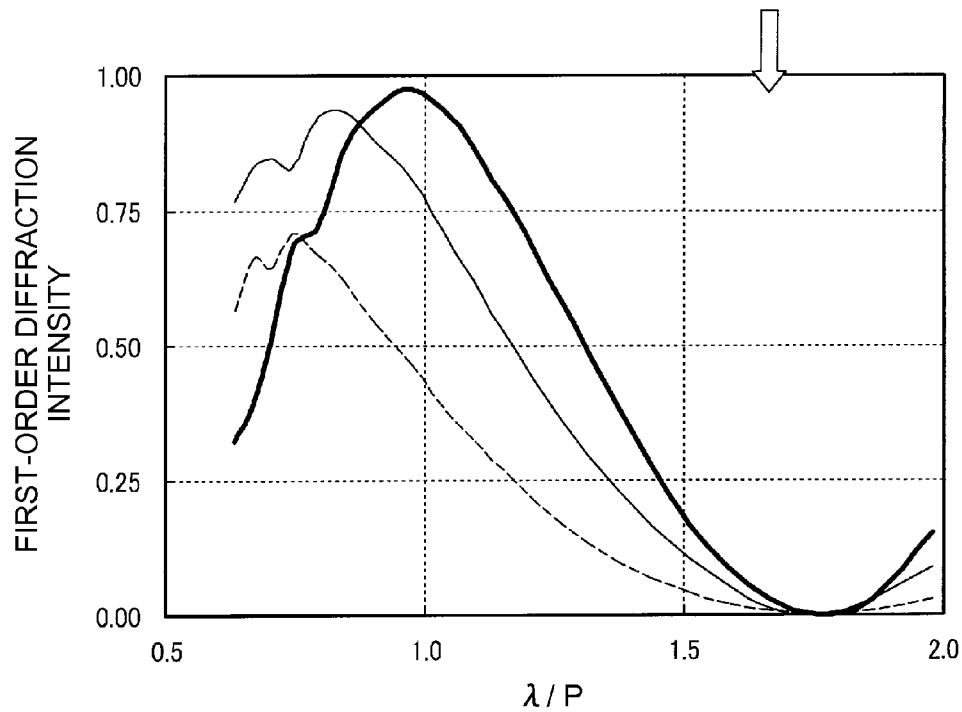
FIG. 10B is a characteristic diagram illustrating the relationship between λ/P and first-order diffraction efficiency for the TM polarized light component.

If the diffractive layer 60 having the inclined convex portions 32C (42C) is used as a single body, polarization dependency is large. FIGS. 10A and 10B show the relationship between the first-order diffraction efficiency and λ/P. In the figures, the thickness h of the refractive index modulation structure is used as a parameter. Under the condition of λ/P=1.7, in a case where the thickness h of the refractive index modulation structure is sufficiently large (the recess is deep), it is possible to obtain high efficiency exceeding 80% for the TE polarized light (refer to FIG. 10A). However, efficiency for the TM polarized light is scarcely expected (refer to FIG. 10B).

Therefore, in the third embodiment, first and second diffractive layers having the inclined convex portions 32C (42C) are provided on both sides of the polarization conversion layer 20 shown in FIG. 1, and thereby the polarization dependency can be removed as in the first embodiment. In addition, in the third embodiment, the wavelength resolution is improved by increasing the diffraction angle θ2, and the period P is made as large as possible in a range here a necessary wavelength resolution can be obtained, thereby widening a band of the diffraction efficiency as well.

The refractive index modulation structure having inclination described in the third embodiment is not limited to the application to the concave and convex pattern according to the first embodiment, but may be applied to the refractive index modulation structure according to the second embodiment shown in FIG. 7.

A manufacturing method of the refractive index modulation structure having inclination described in the third embodiment may employ a method disclosed in commonly owned Japanese Patent Application No. 2010-111124.

In addition, in the first to third embodiments, when the relationship between the wavelength λ to be used and the grating period P is 1.5<λ/P<2.0, the relationship between the thickness h of the refractive index modulation structure and the grating period P is preferably 1.75<h/P<2.50.

4. Fourth Embodiment

As the fourth embodiment, a detection apparatus having the diffraction grating according to any one of the first to third embodiments will be described.

Figure 11A:
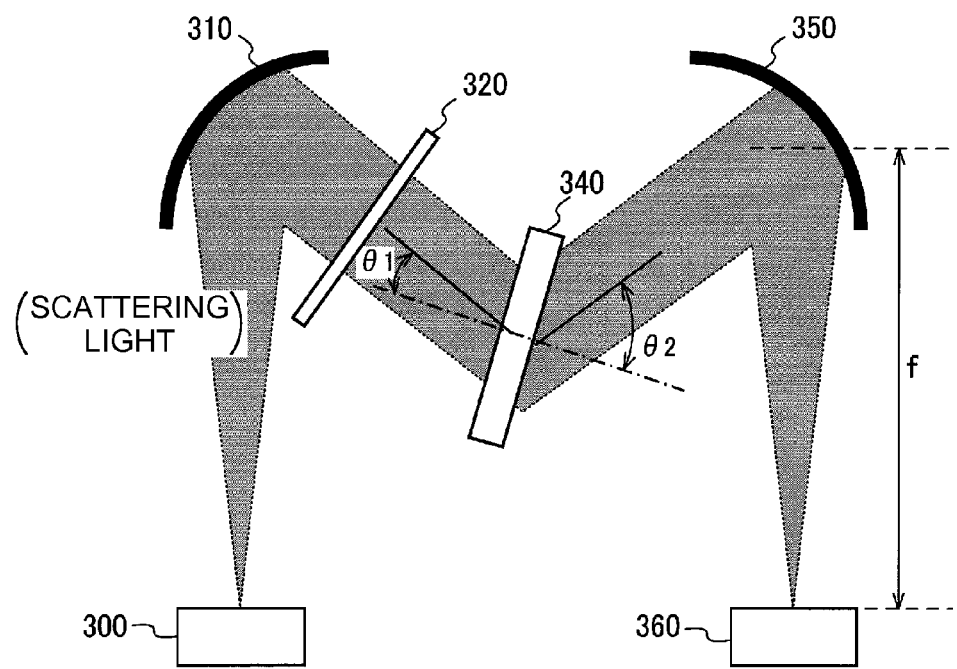
FIGS. 11A and 11B are diagrams illustrating a detection apparatus.
Figure 11B:
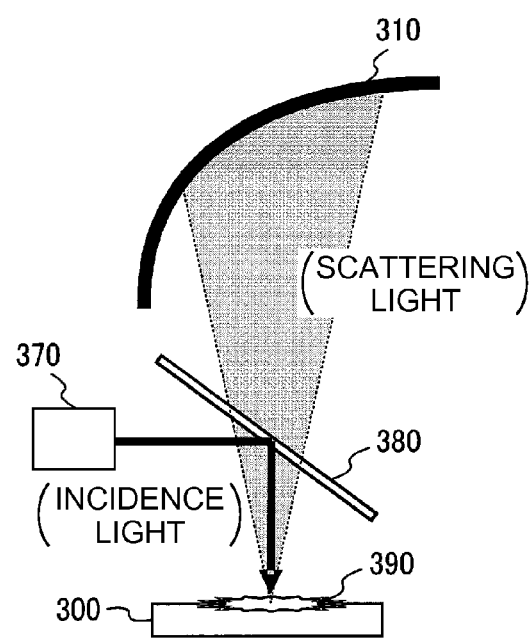
Figure 12:
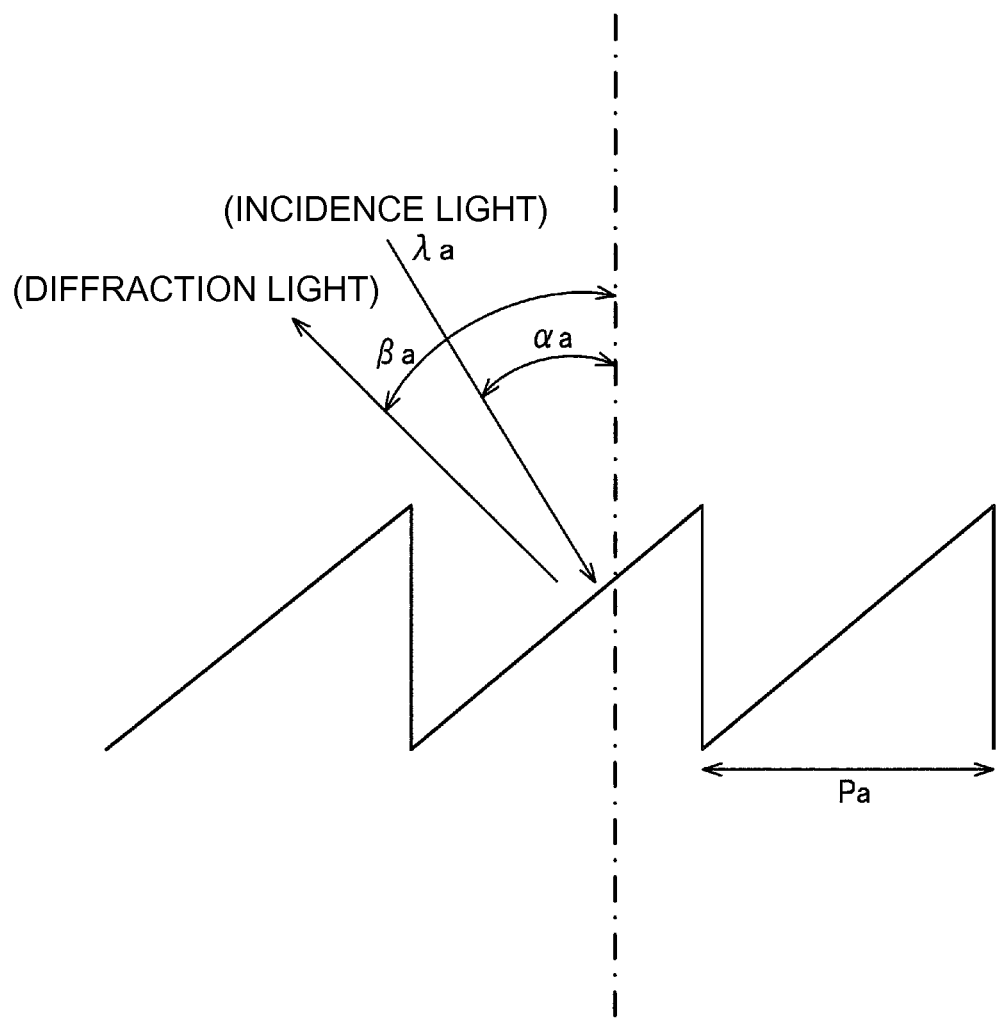
FIG. 12 is a diagram illustrating a blazed diffraction grating according to the related art.
Figure 13:
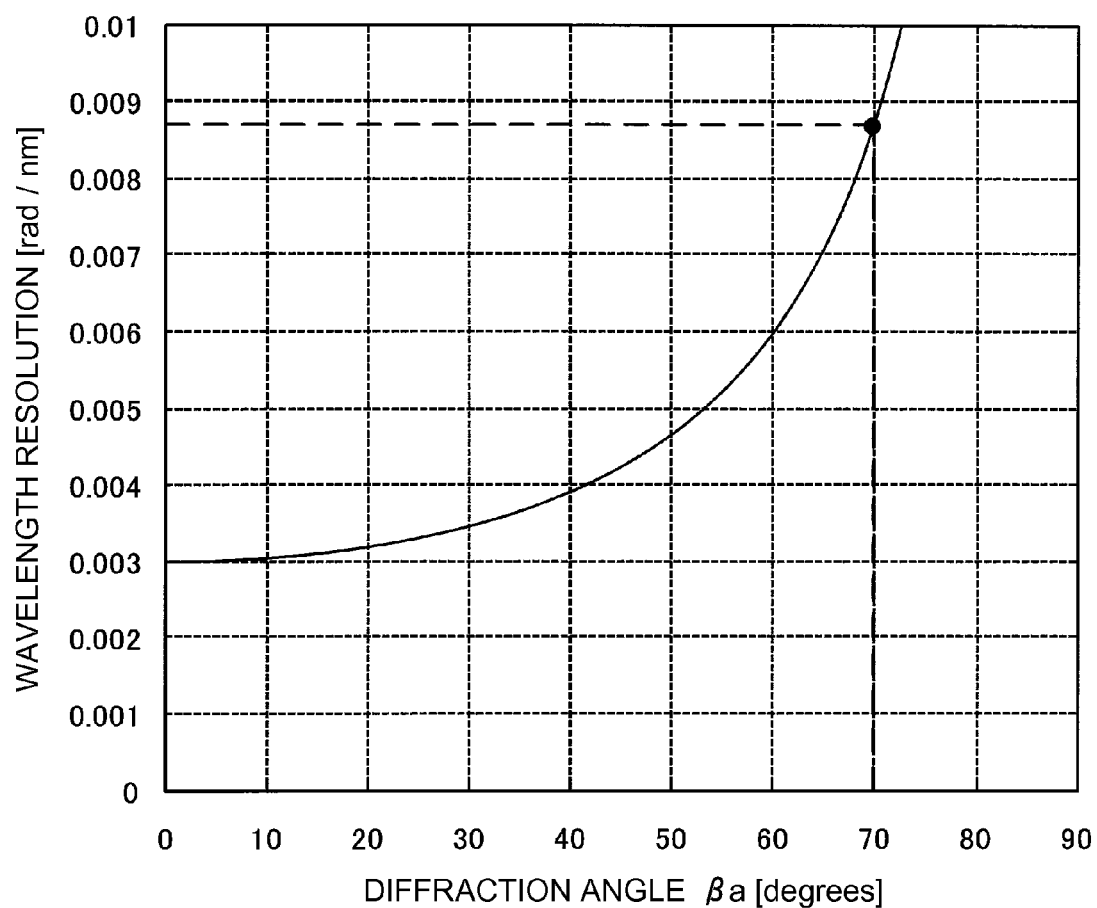
FIG. 13 is a characteristic diagram of the wavelength resolution for the diffraction angle in the blazed diffraction grating shown in FIG. 12.

FIGS. 11A and 11B show a first configuration example of the detection apparatus to which the diffraction grating according to the embodiment is applied. The detection apparatus includes a Raman sensor 300 (a sensor chip, an optical device), a first concave surface mirror 310, a bandpass filter 320, a diffraction grating 340, a second concave surface mirror 350, an array light detector 360 (detector), a light source 370, and an edge filter 380. The detection apparatus is a single spectroscopic apparatus where the single diffraction grating 340 and the two concave surface mirrors 310 and 350 are disposed so as to have a predetermined positional relationship. In addition, hereinafter, although the detection apparatus for performing Raman spectroscopy measurement is described, the diffraction grating according to the embodiment may be applied to detection apparatuses using other spectroscopy methods. In addition, the diffraction grating 340 is assumed as the diffraction grating having, for example, the inclined refractive index modulation structure according to the third embodiment shown in FIG. 8.

As shown in FIG. 11B, laser light from the light source 370 is reflected by the edge filter 380 and is applied to a sample 390 (target object) on the Raman sensor 300. For example, the light source 370 is a continuously oscillating He—Ne laser (the wavelength 633 nm and the output 20 mW). The sample 390 irradiated with the laser light generates Rayleigh scattering light and Raman scattering light by surface enhanced Raman scattering caused by the Raman sensor 300. The scattering light is incident to the edge filter 380. The edge filter 38 reflects light of the wavelength (630 nm) of the laser light and transmits light of the wavelength longer than it therethrough. In other words, the Rayleigh scattering light is reflected by the edge filter 380, and the Raman scattering light transmitted therethrough. The transmitted Raman scattering light is incident to the concave surface mirror 310 and becomes parallel light by the concave surface mirror 310.

Next, as shown in FIG. 11A, reflected light from the concave surface mirror 310 passes through the bandpass filter 320 and is incident to the diffraction grating 340 with a predetermined incidence angle θ1. The bandpass filter 320 further blocks the Rayleigh scattering light and transmits the Raman scattering light therethrough. The incident light to the diffraction grating 340, as described in FIGS. 4A and 4B, undergoes polarization conversion in the first diffractive layer 30, the polarization conversion layer 20, and the second diffractive layer 40, and is diffracted or transmitted with a diffraction angle θ2 so as to be separated. The separated Raman scattering light has a diffraction angle slightly different for each wavelength, and is parallel at each wavelength. The separated Raman scattering light is incident to the concave surface mirror 350, is collected on the array light detector 360 by the concave surface mirror 350, and forms spectral distribution. In addition, the spectral distribution of the Raman scattering light is detected by the array light detector 360.

Next, a wavelength resolution of the detection apparatus will be described in detail. If a position of the Rayleigh scattering light on the array light detector 360 is $X(\lambda)$ and a position of the Raman scattering light (Stokes light) thereon is $X(\lambda+\Delta\lambda)$, a distance between the positions is expressed by the following Equation (6). Here, f denotes a condensing length (focal length) of the concave surface mirror 350, and $\Delta\theta 2/\Delta\lambda$ denotes a wavelength resolution of the diffraction grating 340.

$$X(\lambda+\Delta\lambda)-X(\lambda)=f\cdot\Delta\lambda\cdot(\Delta\theta 2/\Delta\lambda) \quad (6)$$

It can be seen from Equation (6) that, even if the condensing length f of the concave surface mirror 350 is short in a case where the wavelength resolution $\Delta\theta 2/\Delta\lambda$ is sufficiently large, a wide separation can be performed between the Raman scattering light and the Rayleigh scattering light. For this reason, by the use of the diffraction grating having a high resolution according to the embodiment, the condensing length f of the concave surface mirror 350 can be shortened, and thus the spectroscope can be miniaturized by densely disposing the respective constituent elements.

For example, in a case of using the diffraction grating 10 described in FIG. 2 as the diffraction grating 340 shown in FIG. 11A, the period of the diffraction grating is 400 nm (2500 slits/mm), the inclined angle is 0 degrees, the wavelength resolution is 0.005 rad/nm, and the focal length f of the concave surface mirror is 20 mm. In this case, two scattering light components having a wavelength difference of 0.5 nm are separated from each other by 50 μm on the array light detector, and thus sufficient resolution can be performed even using a general array detector. In addition, a distance between the Rayleigh scattering light and the Raman scattering light is 20 μm×50/0.5=2 mm, which is sufficiently distant, if a Raman shift amount is 50 nm. Therefore, a load on the characteristics of the edge filter 380 shown in FIG. 11B is considerably reduced. The edge filter 380 is unnecessary in spectroscopy use where accuracy is relatively low.

In addition, although the embodiments have been described in detail as above, it can be easily understood by a person skilled in the art that various modifications are possible without substantially departing from the noble matters and the effects of the invention. Therefore, the modifications are included in the scope of the invention. For example, the terms (the transmissive diffraction grating, the Raman sensor, the array light detector, and the like) at least once described along with the different terms (the diffraction grating, the sensor chip, the detector, and the like) which have a broader meaning or the same meaning can replaced with the different terms in any part of the specification or the drawings. In addition, configurations and operations of the diffraction grating, the spectroscopic apparatus, the detection apparatus, and the like are not limited to those described in the embodiments and may have modifications.

The entire disclosure of Japanese Patent Application No. 2011-139527, filed Jun. 23, 2011 is expressly incorporated by reference herein.

What is claimed is:

1. A transmissive diffraction grating comprising:
   a polarization conversion layer;
   a first diffractive layer disposed on one surface side of the polarization conversion layer; and
   a second diffractive layer disposed on the other surface side of the polarization conversion layer, wherein
   both the first diffractive layer and the second diffractive layer include refractive index modulation structures arranged with a period P in a first direction, and diffraction efficiency for a TE polarized light component is higher than diffraction efficiency for a TM polarized light component, and
   when a height of the refractive index modulation structure is h and a wavelength of a spectral wavelength band is λ, $1.5<\lambda/P<2.0$ and $1.75<h/P<2.50$ are satisfied.

2. The transmissive diffraction grating according to claim 1, wherein
   the polarization conversion layer is a λ/2 wavelength plate.

3. The transmissive diffraction grating according to claim 2, wherein each of the first diffraction layer and the second diffraction layer further includes a base layer joined to the polarization conversion layer, and has the refractive index modulation structures on the base layer.

4. A detection apparatus comprising:
   the transmissive diffraction grating according to claim 3;
   an optical system that causes scattering light or reflected light from a target object to be incident to the transmissive diffraction grating; and
   a detector that detects diffracted light from the transmissive diffraction grating.

5. The transmissive diffraction grating according to claim 1, wherein
   the polarization conversion layer includes a plurality of laminated quartz crystal plates.

6. A detection apparatus comprising:
   the transmissive diffraction grating according to claim 5;
   an optical system that causes scattering light or reflected light from a target object to be incident to the transmissive diffraction grating; and
   a detector that detects diffracted light from the transmissive diffraction grating.

7. The transmissive diffraction grating according to claim 1, wherein
   the refractive index modulation structures have a concave and convex pattern.

8. A detection apparatus comprising:
the transmissive diffraction grating according to claim 7;
an optical system that causes scattering light or reflected light from a target object to be incident to the transmissive diffraction grating; and
a detector that detects diffracted light from the transmissive diffraction grating.

9. The transmissive diffraction grating according to claim 1, wherein the refractive index modulation structures are configured by alternately laminating a material of a first refractive index and a material of a second refractive index in the first direction.

10. A detection apparatus comprising:
the transmissive diffraction grating according to claim 9;
an optical system that causes scattering light or reflected light from a target object to be incident to the transmissive diffraction grating; and
a detector that detects diffracted light from the transmissive diffraction grating.

11. A detection apparatus comprising:
the transmissive diffraction grating according to claim 2;
an optical system that causes scattering light or reflected light from a target object to be incident to the transmissive diffraction grating; and
a detector that detects diffracted light from the transmissive diffraction grating.

12. A detection apparatus comprising:
the transmissive diffraction grating according to claim 1;
an optical system that causes scattering light or reflected light from a target object to be incident to the transmissive diffraction grating; and
a detector that detects diffracted light from the transmissive diffraction grating.

13. A transmissive diffraction grating comprising:
a polarization conversion layer;
a first diffractive layer disposed on one surface side of the polarization conversion layer; and
a second diffractive layer disposed on the other surface side of the polarization conversion layer, wherein
both the first diffractive layer and the second diffractive layer include refractive index modulation structures arranged with a period P in a first direction, and diffraction efficiency for a TE polarized light component is higher than diffraction efficiency for a TM polarized light component,
each of the first diffractive layer and the second diffractive layer has inclined surfaces formed by a dielectric, and the inclined surfaces are arranged so as to be inclined with respect to a reference line, and
when an incidence angle of incident light is an angle $\theta 1$ ith respect to the reference line, and a diffraction angle of diffracted light is an angle $\theta 2$ with respect to the reference line, the incidence angle $\theta 1$ is smaller than a Bragg angle $\theta$ with respect to the reference line, and the diffraction angle $\theta 2$ is larger than the Bragg angle $\theta$.

14. A detection apparatus comprising:
the transmissive diffraction grating according to claim 13;
an optical system that causes scattering light or reflected light from a target object to be incident to the transmissive diffraction grating; and
a detector that detects diffracted light from the transmissive diffraction grating.

15. The transmissive diffraction grating according to claim 13, wherein
when a wavelength of a spectral wavelength band is $\lambda$, the polarization conversion layer is a $\lambda/2$ wavelength plate.

16. The transmissive diffraction grating according to claim 15, wherein
each of the first diffraction layer and the second diffraction layer further includes a base layer joined to the polarization conversion layer, and has the refractive index modulation structures on the base layer.

17. The transmissive diffraction grating according to claim 13, wherein
the polarization conversion layer includes a plurality of laminated quartz crystal plates.

18. The transmissive diffraction grating according to claim 13, wherein
the refractive index modulation structures have a concave and convex pattern.

19. The transmissive diffraction grating according to claim 13, wherein
the refractive index modulation structures are configured by alternately laminating a material of a first refractive index and a material of a second refractive index in the first direction.

* * * * *